C. J. WILL.
SAUSAGE LINKING MACHINE.
APPLICATION FILED OCT. 25, 1921.

1,419,529.

Patented June 13, 1922.
2 SHEETS—SHEET 1.

Charles J. Will, Inventor.
By James B Mansfield, Attorneys.

C. J. WILL.
SAUSAGE LINKING MACHINE.
APPLICATION FILED OCT. 25, 1921.

1,419,529.

Patented June 13, 1922.
2 SHEETS—SHEET 2.

Charles J. Will, Inventor:
By James P. Mansfield, Attorneys.

UNITED STATES PATENT OFFICE.

CHARLES J. WILL, OF GRANITE CITY, ILLINOIS.

SAUSAGE-LINKING MACHINE.

1,419,529. Specification of Letters Patent. Patented June 13, 1922.

Application filed October 25, 1921. Serial No. 510,236.

*To all whom it may concern:*

Be it known that I, CHARLES J. WILL, citizen of the United States, residing at Granite City, in the county of Madison and State of Illinois, have invented certain new and useful Improvements in Sausage-Linking Machines, of which the following is a specification.

This invention is an improvement in sausage linking machines of the kind shown in Patent #1,316,752, and the principal object of the present invention is to insure that the sausage links will be properly twisted, and to this end I provide an increased number of rollers for twisting the sausage links, and said rollers are preferably corrugated and instead of having one pair of rollers for the sausage to pass over during the twisting I employ two pairs of rollers, and a third pair of movable rollers which cooperate with the two lower pair of rollers and engage the sausage casing so that the latter is rotated as the rollers are revolved, thereby certainly twisting the links in proper satisfactory manner.

I also provide novel means for moving the outer or third pair of rollers into or out of operative position at the proper times.

I further provide novel means for insuring a sufficient length of casing being positioned between the rollers prior to the twisting operation to provide initial slack in the casing between the pinching devices so that the casing will not be broken by the twisting thereof, and novel means for moving the casing slacking device into and out of operative position at the proper times. Other minor novel features will be hereinafter set forth.

I will explain one embodiment of the invention with reference to the accompanying drawings to enable others to adapt and use the same, and set forth in the claims the essential features of the invention and novel combinations and novel constructions of parts for which protection is desired.

Figure 1:
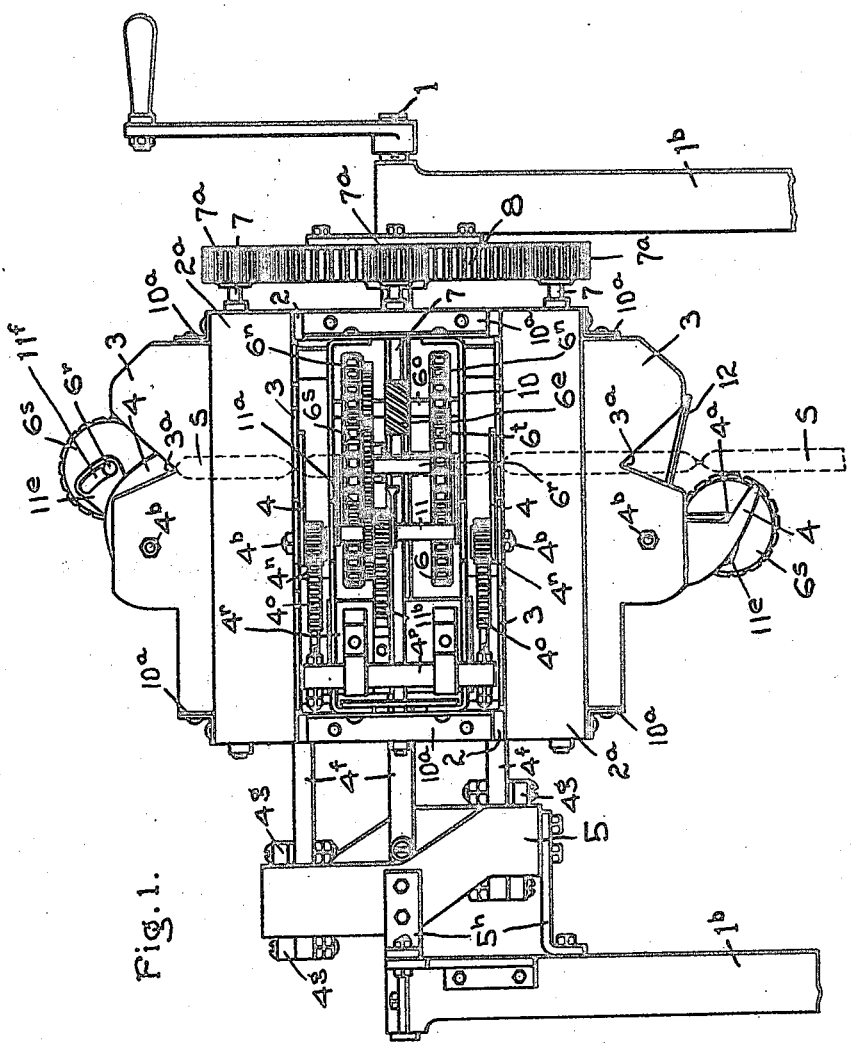
Fig. 1 is a side elevation of the complete machine.
Figure 2:
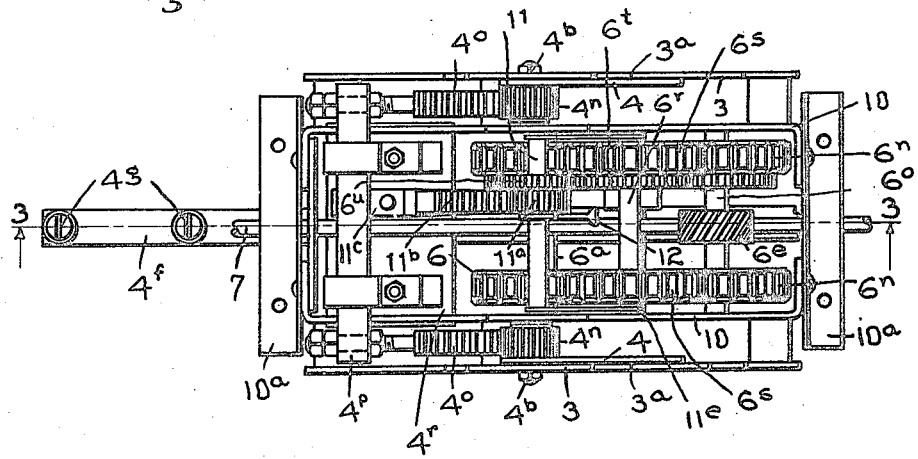
Fig. 2 is an enlarged top plan view of one set of twisting devices.

I have shown the invention as applied to a machine similar in general construction and arrangement to the machine shown in the aforesaid patent.

The machine as shown has a central supporting shaft 1 mounted in bearings on standards $1^b$, which may be attached to any suitable base or support. Mounted upon this shaft 1 between the bearings is a drum composed of opposite end plates or heads 2 and a casing or shell $2^a$. The heads 2 are preferably polygonal in shape and the casing $2^a$ is fastened to and between the heads 2. The drum shown has four approximately flat facets and four intermediate curved facets; but this number may be varied.

In each flat face of the drum may be located a set of link twisting devices as hereinafter explained. Each set is preferably mounted in a rectangular metal frame 10, which may have flanges $10^a$ at its ends bolted or otherwise fastened to the heads 2.

Attached to each side of the frame 10 and extending longitudinally of the drum are metal plates 3 each of which has a preferably V-shaped notch $3^a$ at its center, the apex of this notch being adjacent the exterior surface of the drum.

Pivotally connected to each plate 3 is a pinching plate 4 which is provided with a recess $4^a$ arranged to come opposite the notch $3^a$, and adapted to co-act therewith in pinching the stuffed sausage casing S.

Each pinching plate 4 is preferably pivoted to the related plate 3, at one side of notch $3^a$, as indicated at $4^b$; and each pinching plate is provided with a segment $4^n$ which is concentric with pivot $4^b$ and is engaged by a rack $4^c$, which may be adjustably bolted to a cross piece $4^p$ attached to a slide $4^r$ mounted to move longitudinally of frame 10.

To slide $4^r$ is connected a bar $4^f$ which projects outside of the drum at one end and into and through a cam ring 5, which is fixedly supported, circumferentially of the shaft 1, by means of bracket arms $5^b$ connected to the cam ring and to the standards $1^b$ or other suitable support, as described in said patent, so that the cam ring is non-rotatable. The bars $4^f$ will move orbitally around the shaft 1 as the drum rotates, and the ends of the bars $4^f$ travel around and within the cam ring 5. Each bar $4^f$ is provided with rollers $4^g$ at opposite sides of the cam ring 5, and as the drum is rotated said rollers engaging opposite edges of the cam ring 5 will cause the bars $4^f$ to reciprocate; and through the connected racks $4^o$ and segments $4^n$ cause the pinching plates 4 to swing open and remain open for and during part of the rotation of the drum, ad then to close upon and pinch the sausage casing in the notches of the related plates 3 and remain closed during part of the rotation of the drum, as hereinafter explained.

In the machine shown there would be four sets of twisting devices and four bars $4^f$, one arranged in each frame 10, and each bar $4^f$ operates the two related adjacent pinching plates 4.

In each frame 10 between the opposed plates 3 are arranged two pairs of rollers 6, and $6^n$. The rollers 6 are mounted on a shaft $6^a$, and the rollers $6^n$ on a shaft $6^o$, said shafts being journaled in similar bearings in the frame 10.

On the shaft $6^a$ is a gear $6^b$ meshing with an intermediate pinion $6^c$ mounted on a shaft $6^d$ journaled in the frame 10, and the intermediate pinion $6^c$ meshes with a pinion $6^p$ on the shaft $6^o$. By this means the rollers 6 and $6^n$ can be driven at the same speed but in opposite directions. The rollers may be driven by any suitable means.

As shown a preferably spiral or worm gear $6^e$ is keyed on the shaft $6^o$ and meshes with an opposed worm $7^e$ on a related shaft 7 suitably mounted in the drum, and, as shown in said patent, each shaft 7 extends outwardly through the head 2 of the drum at the end opposite the cam 5; and on the outer end of each shaft 7 is a pinion $7^a$ which meshes with a large gear 8 that is non-rotatably fastened to the adjacent standard $1^b$ or other support.

Suitably mounted on or in each frame 10 is a shaft 11 which is adjacent but above the shaft $6^a$, and on shaft 11 is a pinion $11^a$ which meshes with a rack $11^b$ mounted on a bracket $11^c$ fastened to the slide $4^r$, so that when the slide $4^r$ is reciprocated shaft 11 will be oscillated.

Fastened to shaft 11 is a casing slacking finger or arm 12, which is adapted to be swung, by the oscillation of shaft 11, at the proper times, to lift up the sausage casing prior to the twisting thereof, and to lower the same before the twisting thereof.

Attached to the shaft 11 are brackets $11^e$ in which is journaled a shaft $6^r$ carrying a set of movable rollers $6^s$ which are adapted to cooperate with rollers 6, $6^n$ in twisting the sausage casing. The shaft $6^r$ is preferably mounted in arcuate slots $11^f$ in the arms $11^e$ so that the rollers $6^s$ may adjust themselves relatively to the sausage casing S. On shaft $6^r$ is a pinion $6^t$ meshing with an intermediate pinion $6^u$ loosely mounted on the shaft 11 and which meshes with the gear $6^b$ on shaft $6^a$, so that the rollers $6^r$ will be driven in unison with rollers 6, $6^n$.

As the upper rollers $6^s$ are lowered upon the sausage casing and the fingers 4 pinch the same the arm 12 is dropped out of the way leaving a length of the sausage casing lying slack or loosely upon the rollers 6, $6^n$ with sufficient slack to permit the link to be properly twisted without breaking the skin during the twisting. The upper rollers $6^s$ readily adjust themselves to any thickness of sausage casing either small or large.

The drum may be turned by a crank applied to one end of shaft 1, or by any other suitable means. As the drum is rotated the rollers 6 are rapidly turned by the gearing between said rollers and the gear 8, which gearing should be proportioned to impart the desired speed of rotation to the rollers 6; the pinions $7^a$ meshing with and revolving around gear 8 are driven thereby as the drum is rotated.

During the rotation of the drum the bars $4^f$ are reciprocated by their engagement with the cam 5, and said cam is so shaped as to cause the bars $4^f$ to move racks $4^o$ and cause pinching plates 4 to close upon the stuffed casing after they reach the ascending side of the drum and to swing open after reaching the descending side of the drum as described in said patent.

In starting the machine the end of the stuffed sausage casing S is held in position to be engaged by one of the pinching plates 4 at the ascending side of the drum; and as the drum is rotated the sausage casing is drawn around and over the drum and lies within the open notches $3^a$ or bars 3. As the drum rotates the pinching plates 4 are successively closed upon the sausage casing at the ascending side of the machine and pinch this casing into link form and the sausage links held in contact with the adjacent rollers 6, $6^n$, $6^s$ are rapidly rotated on their longitudinal axes as above described, thus spinning or twisting the links at the points where they are pinched so that the sausage casing is formed into a series of similar links, for marketing.

*Operation.*

Figure 3:
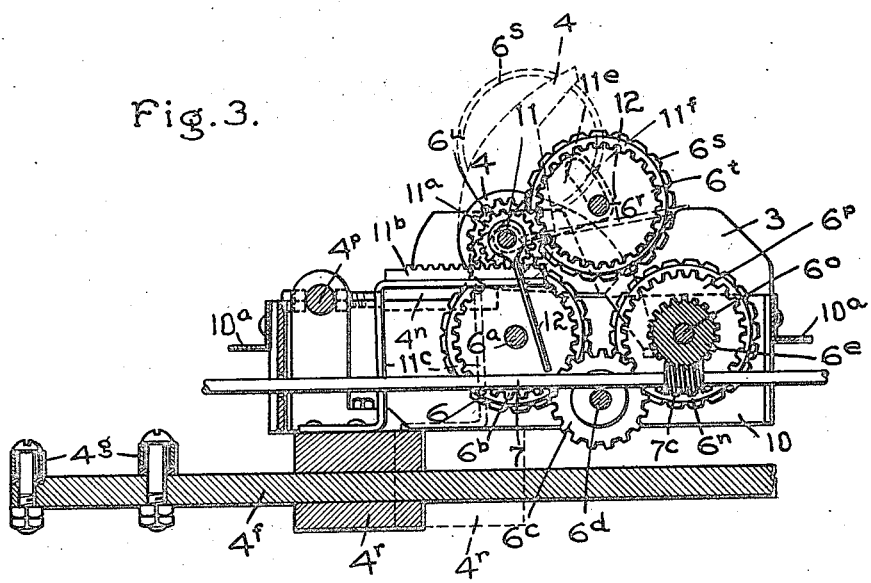
Fig. 3 is a longitudinal section on the line 3—3 Fig. 2.

The sausage casing S is laid or drawn across the frame while the pinching plates 4 and the casing slacking arm 12 are in raised position, as indicated in dotted lines in Fig. 3, so that the portion of the sausage casing between the plates 4 is bowed or uplifted by arm 12, and at that time the rollers $6^s$ are raised as indicated in Fig. 3 so as not to contact with the sausage casing which then rests upon the rollers 6, $6^n$ and arm 12. Then as the drum rotates the slide $4^r$ is moved outward thereby causing racks $4^o$ to lower the plates 4 and cause them to pinch the sausage casing against the bars 3, and at the same time arm 12 is lowered leaving a length of the sausage casing sufficient to form a link lying slack between the pinched portions. At the same time the rollers $6^t$ are lowered onto the sausage casing being yieldably held thereagainst by their weight; and the three rotating sets of rollers 6, $6^n$, $6^s$ impart rotation to the section of the sausage casing intermediate the pinching plates 3, and form such part of the sausage casing into a link.

Preferably the peripheries of the rollers 6, $6^n$, $6^s$ are roughened or corrugated so that they will engage and insure the rotation of the sausage casing even though they become greasy.

The number of facets and sets of pinching plates, and twisting rollers, etc. can be varied according to the desired size and capacity of the machine. The machine may have any number of sets of linkers, and there may be more than one set or series of sets on the same shaft, the capacity of the machine being limited only by the number of sets of twisting devices employed thereon; each set of twisting devices being like the others. It will also be possible to increase the capacity of the machine by lengthening same and making additional notches in the plates 3, and providing additional pinching plates and sets of twisting rollers, so that more than one stuffed sausage casing could be simultaneously operated upon.

What I claim is:

1. In a machine for twisting stuffed sausage casings into links, the combination of twisting rollers, pinching devices at opposite ends of the rollers, and means adapted to cause a slack in the casing between the pinching devices prior to the twisting operation.

2. In a machine as set forth in claim 1, the slacking means comprising an oscillatory member adapted to engage and bow the sausage casing between the pinching devices before the latter engage the casing, and to release the casing after the same is pinched and before it is twisted.

3. In a machine for linking stuffed sausage casing, the combination of means for pinching the sausage casing at separated points, rollers intermediate the pinching means adapted to engage the sausage casing, and a movable set of rollers between the pinching device adapted to cooperate with the first rollers in rotating the sausage casing; means for separating the rollers when the pinching means are opened, and for returning the rollers to operative position when the sausage casing is pinched.

4. In a sausage machine as set forth in claim 3, means for causing slack in the sausage casing between the pinching devices before the casing is pinched, and means for disengaging the slacking devices from the casing when the latter is pinched.

5. In mechanism as set forth in claim 3 an oscillating arm for slacking the sausage casing between the pinching means, and means for disengaging the arm from the casing after the sausage is pinched and prior to the completion of the twisting operation.

6. In a machine for linking stuffed sausage casing, the combination of means for pinching the sausage casing at separate points, two sets of rollers intermediate the pinching devices and adapted to engage and rotate the sausage casing, and a third movable set of rotatable rollers between the pinching devices adapted to cooperate with the other sets of rollers in rotating the sausage casing, and means for raising the movable set of rollers when the pinching plates are opened and for returning the movable set of rollers into operative position when the sausage is pinched.

7. In a sausage machine as set forth in claim 6, means for causing slack in the sausage casing between the pinching devices before the casing is pinched thereby, and means for disengaging the slacking devices from the casing when the latter is pinched.

8. In a machine of the character specified the combination with stuffed casing rotating means, means for pinching the casing, an oscillatory arm for slacking the casing, a toothed member connected with the arm and a rack bar engaging the toothed member for operating the same.

9. In a machine of the character specified; means for rotating a stuffed casing, oscillatory arms for pinching the casing, toothed members connected with the arms and oscillatory rack bars engaging the toothed portions for operating the arms.

10. In a machine of the character specified, means for rotating a stuffed casing, oscillatory arms for pinching the casing, a casing slacking arm, toothed members connected with the pinching arms and slacking arm, and rack bars engaging the toothed members and a slide for operating the rack bars.

11. In a machine for linking stuffed sausage casings; the combination of notched bars, pinching arms cooperating with the bars, segments connected with the pivots of said arms, a slidable member and racks connected with the slidable member engaging said segments.

12. In a machine for linking stuffed sausage casings the combination of notched bars, pinching arms cooperating with the bars, segments connected with the pivots of said arms, a slidable member, racks connected with the slidable member engaging said segments, rollers intermediate the bars for rotating the casing, a rock shaft adjacent the rollers, a link slacking arm connected with the rock shaft, and a rack bar engaging said arm connected with the slidable member.

13. In a machine for linking stuffed sausage casings, the combination of means for pinching the casing, rollers intermediate the pinching bars for rotating the casing, a rock shaft adjacent the rollers, a slidable member, a rack bar engaging said arm connected with the slidable member, and a set of rollers loosely mounted in said arms and adapted to cooperate with the other rollers in rolling the sausage casing, substantially as described.

14. In a machine for linking stuffed sausage casings, means for pinching the casing, rollers intermediate the pinching means for rotating the casing, a rock shaft adjacent the rollers, a link slacking arm connected with the rock shaft, a slidable member, and a rack bar engaging said arm connected with the slidable member, arms connected with the rock shaft, and a set of rollers loosely mounted in said arms and adapted to cooperate with the other rollers in rolling the sausage casing.

15. In a machine for linking stuffed sausage casings the combination of notched bars, pinching arms cooperating with the bars, segments connected with the pivot of said arms, a slidable member, racks connected with the slidable member engaging said segments, rollers intermediate the pinching bars for rotating the casing, a rock shaft adjacent the rollers, arms connected with the rock shaft, and a set of rollers mounted in said arms and adapted to cooperate with the other rollers in rolling the sausage casing, and gearing between the sets of rollers.

16. In a machine for linking stuffed sausage casings as set forth in claim 15, a link slacking arm connected with the rock shaft, and a rack bar engaging said arm connected with the slidable member, substantially as described.

In testimony whereof I affix my signature.

CHARLES J. WILL.